Patented July 24, 1934

1,967,363

UNITED STATES PATENT OFFICE 1,967,363

PRODUCTION OF NITROGENOUS VAT DYESTUFFS

Max Albert Kunz, Mannheim, and Karl Koeberle, Ludwigshafen - on - the - Rhine, Germany, assignors to General Aniline Works, Inc., New York, N. Y., a corporation of Delaware No Drawing. Application October 22, 1928, Serial No. 314,310. In Germany November 3, 1927

14 Claims. (Cl. 260—61)

The present invention relates to the production of nitrogenous vat dyestuffs containing a dibenzanthrone or iso-dibenzanthrone radicle.

We have found that valuable vat dyestuffs are obtained by condensing dibenzanthrone or iso-dibenzanthrone, or a derivative thereof, which compounds are hereinafter referred to for the sake of brevity as dibenzanthrones, containing at least one nitrogen atom to which a reactive hydrogen atom is attached, for instance, aminodibenzanthrone or amino-iso-dibenzanthrone or the corresponding monoalkyl-amino or monoacyl-amino derivatives, with mono-cyclic compounds substituted on the nucleus by at least one oxygen atom or one hydroxy group and at least one exchangeable negative substituent, such as halogen atoms, nitro-groups and the like. As negatively substituted compounds of the aforesaid kind picryl chloride, chloranile, chlorophenol, the imides of aliphatic dicarboxylic acids containing more than 2 carbon atoms, for instance the imides of malonic, maleic, succinic acid and the like containing one or more negative substituents, such as halogen atoms may be mentioned.

The condensation is suitably carried out in solvents or diluting media of a high boiling point, such as for instance nitrobenzene, naphthalene, anthracene and the like, preferably in the presence of acid-fixing agents, such as sodium acetate and condensing catalysts, for instance metal or metal compounds, such as copper, copper oxid, copper carbonate, mercury oxid, aluminium and the like.

In the case of poly-negatively substituted compounds, the whole or only a portion of the negative substituents may be replaced, as desired, by the nitrogenous dibenzanthronyl- or isodibenzanthronyl radicle. The reactive negative groups remaining in the condensation product in the latter case can be replaced by radicles of aromatic hydroxy compounds, such as phenols or thiophenols. For example, the nitrogenous dibenzanthrone or isodibenzanthrone derivative forming the initial material may be made to act upon the said negatively-substituted, mono-nuclear compound, either alone or in admixture with the said other reactive compounds, or subsequently to treatment with these.

The new vat dyestuffs obtainable according to the present invention are, for the most part, produced with an excellent yield. For the purpose of purification, they may be recrystallized from organic solvents of high boiling point; but in many instances, a simple boiling with solvents is sufficient. According to the selection of the acting components, vat dyestuffs of very varied character are obtained which give extremely fast dyeings, in a great variety of shade on vegetable fibres, from the vat.

The following examples will further illustrate the nature of the said invention which however is not limited thereto. The parts are by weight.

Example 1

47 parts of aminodibenzanthrone obtainable by reducing the nitrodibenzanthrone obtained according to U. S. Patent No. 796,393, 25 parts of chloranile, 20 parts of sodium acetate, and 0.5 part of cupric oxid, are stirred and boiled with 500 parts of nitrobenzene until no more unaltered aminodibenzanthrone can be detected, which will be the case in about 8 hours. After filtration by suction while hot, the residue is extracted by boiling with water and dilute acid, and dried. The new dyestuff is a blue black powder which dissolves to a violet solution in concentrated sulfuric acid and gives fast blue dyeings with a greenish tinge on cotton from a blue vat.

Example 2

A suspension of 50 parts of aminodibenzanthrone, prepared by reducing the nitrodibenzanthrone obtainable according to U. S. Patent No. 1,513,851, 12.5 parts of chloranile, 50 parts of sodium acetate and 1 part of copper carbonate, in 1000 parts of nitrobenzene, is stirred at from 210° to 215° centigrade, until the formation of the dyestuff is complete. The further treatment is the same as in Example 1. The dyestuff, which is obtained in the form of a blue black powder, dissolves to a violet solution in concentrated sulfuric acid, and gives very fast blue dyeings on cotton from a blue hydrosulfite vat.

Example 3

4.5 parts of dibrommaleic imide are dissolved in 250 parts of nitrobenzene and boiled while stirring for about 8 hours with 1 part of copper oxid, 5 parts of sodium carbonate and 9.5 parts of aminodibenzanthrone. After working up the reaction mixture as described in Example 1, a black powder is obtained dissolving to a violet solution in concentrated sulfuric acid and dyeing cotton from a blue vat blue green shades of very good fastness.

Example 4

10 parts of the reaction product obtained according to Example 1 are suspended in 100 parts of phenol and are heated while stirring at from 170° to 180° C. after the addition of 20 parts of potassium carbonate, until the formation of the dyestuff is complete. The reaction mixture is worked up by distilling off the excess of phenol by steam and separating the dyestuff by filtration. The dyestuff is a black powder dissolving to a violet solution in concentrated sulfuric acid, dyeing cotton from a blue vat blue grey shades.

*Example 5*

9.4 parts of amino-iso-dibenzanthrone are boiled for 15 hours while stirring in 250 parts of nitrobenzene with 10 parts of sodium acetate, 2 parts of copper oxid and 2.5 parts of chloranile. The dyestuff recovered in the usual manner is a blue powder dissolving to a green solution in concentrated sulfuric acid and dyes cotton from a blue vat strong blue very fast shades.

What we claim is:—

1. A process of producing nitrogenous vat dyestuffs which comprises condensing chloranile with a dibenzanthrone containing at least one nitrogen atom to which a reactive hydrogen atom is attached.

2. A process of producing nitrogenous vat dyestuffs which comprises condensing chloranile with aminodibenzanthrone.

3. Nitrogenous vat dyestuffs corresponding to the general formula

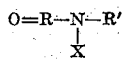

in which X stands for hydrogen or an alkyl group, R' for a dibenzanthrone radicle and R for a mononuclear radicle, the oxygen atom being directly attached to the nucleus of R.

4. Nitrogenous vat dyestuffs corresponding to the general formula

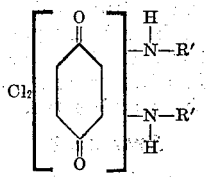

in which R' stands for dibenzanthrone radicles, forming a blue black powder, dissolving to a violet solution in concentrated sulfuric acid and dyeing cotton blue shades from a blue vat.

5. A process of producing nitrogenous vat dyestuffs which comprises condensing a mono-nuclear compound substituted on the nucleus by at least one oxygen atom and at least 1 substituent selected from the group consisting of the halogens and the nitro group with a dibenzanthrone containing at least 1 nitrogen atom to which a reactive hydrogen atom is attached.

6. A process of producing nitrogenous vat dyestuffs which comprises condensing a mono-nuclear compound substituted on the nucleus by at least 1 oxygen atom and at least 1 substituent selected from the group consisting of the halogens and the nitro group with a dibenzanthrone containing at least 1 nitrogen atom to which a reactive hydrogen atom is attached, in the presence of a diluent of high boiling point.

7. A process of producing nitrogenous vat dyestuffs which comprises condensing a mono-nuclear compound substituted on the nucleus by at least 1 oxygen atom and at least 1 substituent selected from the group consisting of the halogens and the nitro group with a dibenzanthrone containing at least 1 nitrogen atom to which a reactive hydrogen atom is attached, in the presence of a diluent of high boiling point and an acid-fixing agent.

8. A process of producing nitrogenous vat dyestuffs which comprises condensing a mono-nuclear compound substituted on the nucleus by at least 1 oxygen atom and at least 1 substituent selected from the group consisting of the halogens and the nitro group with a dibenzanthrone containing at least 1 nitrogen atom to which a reactive hydrogen atom is attached, in the presence of a diluent of high boiling point, an acid-fixing agent and a condensing catalyst.

9. A manufacture of vat dyestuffs of the dibenzanthrone series by treating amino-dibenzanthrones with a halogenated quinone of the benzene series at temperatures over 100° C.

10. A manufacture of vat dyestuffs of the dibenzanthrone series by treating amino-dibenzanthrone with a halogenated quinone of the benzene series at temperatures over 100° C.

11. A manufacture of vat dyestuffs of the dibenzanthrone series by treating amino-dibenzanthrone with tetra-chloroquinone at temperatures over 100° C.

12. The products of the reaction between the halogenated quinones of the benzene series and amino-dibenzanthrones, which products form blackish powders which dissolve in concentrated sulfuric acid to dark violet solutions and in boiling nitrobenzene or aniline to blue-green solutions, dyeing vegetable fiber from a blue vat deep green to blue-green tints of excellent properties of fastness, particularly to chlorine.

13. The products of the reaction between the halogenated quinones of the benzene series and amino-dibenzanthrone, which products form blackish powders which dissolve in concentrated sulfuric acid to dark violet solutions and in boiling nitrobenzene or aniline to blue-green solutions, dyeing vegetable fiber from a blue vat deep green to blue-green tints of excellent properties of fastness, particularly to chlorine.

14. The products of the reaction between tetra-chloroquinone and amino-dibenzanthrone, which products form blackish powders which dissolve in concentrated sulfuric acid to dark violet solutions and in boiling nitrobenzene or aniline to blue-green solutions, dyeing vegetable fiber from a blue vat deep green to blue-green tints of excellent properties of fastness, particularly to chlorine.

MAX ALBERT KUNZ.
KARL KOEBERLE.